US011611247B2

(12) United States Patent
Bauer et al.

(10) Patent No.: US 11,611,247 B2
(45) Date of Patent: Mar. 21, 2023

(54) TRANSVERSE FLUX MACHINE

(71) Applicants: Johannes Gabriel Bauer, Neuried (DE); Daniel Merz, Munich (DE); Andreas Reeh, Nuremberg (DE); Yunyang Zhao, Erlangen (DE)

(72) Inventors: Johannes Gabriel Bauer, Neuried (DE); Daniel Merz, Munich (DE); Andreas Reeh, Nuremberg (DE); Yunyang Zhao, Erlangen (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 32 days.

(21) Appl. No.: 17/037,945

(22) Filed: Sep. 30, 2020

(65) Prior Publication Data
US 2021/0099036 A1 Apr. 1, 2021

(30) Foreign Application Priority Data

Sep. 30, 2019 (DE) .......................... 102019215015.2

(51) Int. Cl.
*H02K 1/28* (2006.01)
*H02K 1/16* (2006.01)
*H02K 3/47* (2006.01)

(52) U.S. Cl.
CPC .............. *H02K 1/165* (2013.01); *H02K 3/47* (2013.01); *H02K 2201/12* (2013.01)

(58) Field of Classification Search
CPC .... H02K 1/165; H02K 1/145; H02K 2201/12; H02K 3/47; H02K 21/125
See application file for complete search history.

(56) References Cited

U.S. PATENT DOCUMENTS

| 7,138,734 B2 * | 11/2006 | Kim | ........................ H02K 41/03 310/13 |
| 7,868,510 B2 * | 1/2011 | Rittenhouse | .............. H02P 6/24 310/216.069 |
| 2013/0113320 A1 * | 5/2013 | Calley | .................... H02K 1/145 310/216.061 |

FOREIGN PATENT DOCUMENTS

| AT | 504456 A1 | 5/2008 |
| EP | 2605367 A1 | 6/2013 |
| WO | 2012113654 A2 | 8/2012 |

OTHER PUBLICATIONS

German Search Report for German Application No. 10 2019 215 015.2 dated Nov. 26, 2020.

* cited by examiner

*Primary Examiner* — Dang D Le
(74) *Attorney, Agent, or Firm* — Lempia Summerfield Katz LLC

(57) ABSTRACT

A stator pole for a stator of a transverse flux machine is provided. The stator includes a stator winding arranged in a winding space, and the winding space being formed circumferentially in a circumferential direction in relation to an axis of rotation of a rotor. The stator pole has a body element made of a ferromagnetic material, which has at least one pole head which, in the installation position, may be arranged opposite the one rotor, and a magnetic return path region, which may be arranged facing away from the one rotor, wherein a number of the pole heads of the stator pole correspond to a number of the rotors. The stator pole is configured to occupy only a portion of a circumference of the winding space in the circumferential direction, and the magnetic return path region has a curved shape which adjoins the at least one pole head, as a result of which the magnetic return path region is designed to define the wind- (Continued)

ing space in part transversely to the circumferential direction.

15 Claims, 12 Drawing Sheets

TRANSVERSE FLUX MACHINE

The present patent document claims the benefit of German Patent Application No. 10 2019 215 015.2, filed Sep. 30, 2019, which is hereby incorporated by reference.

TECHNICAL FIELD

The disclosure relates to a stator pole for a stator of a transverse flux machine, a stator, a transverse flux machine, and a linear machine.

BACKGROUND

A transverse flux machine is a rotating electrical machine in which a relevant magnetic flux arises substantially transversely or perpendicularly to an axis of rotation of the at least one rotor of the transverse flux machine. The transverse flux machine is frequently designed as a permanently excited synchronous machine and may be designed to be subjected to a single-phase or polyphase AC voltage. However, for that reason, the transverse flux machine may also be designed as an asynchronous machine. The construction of the transverse flux machine makes it possible to construct magnetic and electric circuits substantially independently of one another. Furthermore, axial end windings, which may not contribute to generating torque, may be largely avoided. Furthermore, by the transverse flux machine, a very fine pole pitch may be achieved which makes it possible to provide a high torque at a low speed. As a result, it is at least possible to reduce complexity in relation to any gear mechanism provided, or even to completely omit the gear mechanism.

Transverse flux machines are thus particularly suitable as electric drives for applications with high requirements in terms of torque density at a low speed. As a result, a direct drive may be achieved by the transverse flux machine. In this case, a required torque may be provided completely by the transverse flux machine. In comparison with conventional rotating electrical machines, which may be equipped accordingly by a gear mechanism, by using the transverse flux machine, the complexity of an overall system of an application may be reduced. In this case, a large air gap diameter, a short axial length, a small air gap in the radial direction, a high number of pole pairs (e.g., with a fine pole pitch), and/or surface-mounted permanent magnets in the rotor may be achieved as features.

By transverse flux machines, high numbers of pole pairs may be achieved because, as a result of a three-dimensional flux guide of the magnetic flux, a construction may be simplified at least in part in terms of the usable space in relation to a magnetic and electrical circuit. In this case, additional stator poles having relatively low complexity may additionally be inserted along a winding window of the air gap of a coil side. A current density may remain low as a result of a winding window which is large in comparison with conventional electrical machines. A transverse flux machine of this type is disclosed, for example, by EP 2 605 367 A1, which discloses a transverse flux machine including a rotor-side magnet assembly in the manner of a Halbach array.

Variants of transverse flux machines, which are designed for high torques and which include surface-mounted permanent magnets in a Halbach array and an iron-free rotor, require a claw-shaped geometry made of a material having the greatest possible magnetic permeability and saturation flux density for the guidance of the magnetic flux in the stator. In order to reduce eddy currents in the normal operation of the transverse flux machines, this material is frequently provided in laminated form or also as a soft magnetic composite (SMC). In this case, by the first variant, much greater or more advantageous material properties may be achieved. However, the laminated form, formed for example from iron sheets, makes it possible to provide only limited effectiveness when components of the flux to be guided are directed parallel to the lamination. In particular, flux guidance of the magnetic flux may take place in the direction of the lamination. In the case of a magnetic flux perpendicular to the lamination, eddy currents may be produced. If possible, the orientation of the sheets may therefore be selected so as to prevent perpendicular flux components. Especially in the case of the above-mentioned claw geometries, both a main flux of the magnetic flux and a leakage flux of the magnetic flux are frequently directed three-dimensionally. As a result, the effectiveness of the lamination, (e.g., against eddy current losses and corresponding material heating), is limited in the case of the known constructions. Consequently, in view of the thermal load of the transverse flux machine together with the components thereof, an operating range is restricted to only low speeds and/or operating frequencies in relation to the AC voltage.

Furthermore, with respect to the complexity of a drive system, an air-cooled machine design is advantageous in comparison with a liquid-cooled machine design. However, in this case, air cooling may lead to a lower thermal capacity, and thus lower Nusselt numbers of airflows in direct comparison with liquid cooling may lead to a higher temperature in relation to the elements to be cooled of the transverse flux machine. As a result, for many applications, the achievable power density may be restricted in the case of air-cooled drive systems. By a forced air flow, only a limited improvement may be achieved in this regard.

The problems relating to eddy current losses in the case of claw pole geometries may be reduced by using SMC as a material. By grain-surrounding insulation layers, eddy currents may be suppressed regardless of the magnetic orientation thereof. However, the magnetic conductivity of SMC is much lower than that of ferromagnetic sheets, as a result of which an achievable torque density of transverse flux machines constructed in this manner is limited.

SUMMARY AND DESCRIPTION

The problem addressed by the disclosure is thus that of developing a generic transverse flux machine to the effect that, in the case of good cooling properties, losses and leakage fluxes of the magnetic flux and the disadvantageous effects thereof may be reduced.

The scope of the present disclosure is defined solely by the appended claims and is not affected to any degree by the statements within this summary. The present embodiments may obviate one or more of the drawbacks or limitations in the related art.

As a solution, the disclosure proposes a stator pole for a stator of a transverse flux machine, a stator of a transverse flux machine, a transverse flux machine, and a linear machine as disclosed herein. The stator includes a stator winding arranged in a winding space, and the winding space being formed circumferentially in a circumferential direction in relation to an axis of rotation of at least one rotor of the transverse flux machine, the stator pole having a body element made of a ferromagnetic material, which has at least one first pole head which may be arranged in an installation position opposite the at least one rotor and a magnetic return path region which may be arranged in an installation position facing away from the at least one rotor. In addition, the disclosure relates to a stator for a transverse flux machine, including a stator winding arranged in a winding space of the stator, the winding space being formed circumferentially in a circumferential direction in relation to an axis of rotation of at least one rotor of the transverse flux machine. Furthermore, the disclosure also relates to a transverse flux machine, including a stator which has a stator winding arranged in a winding space, and at least one rotor which is arranged so as to be rotatable relative to the stator, the winding space being formed circumferentially in the circumferential direction in relation to an axis of rotation of the at least one rotor. Lastly, the disclosure also relates to a linear machine, including a stator which has a stator winding arranged in a winding space, and at least one rotor which is arranged so as to be transversely displaceable relative to the stator, the winding space being formed in a longitudinal direction along a displacement path of the at least one rotor.

In relation to a stator pole, the disclosure proposes in particular that a number of the pole heads of the stator pole correspond to a number of the rotors, and, in the installation position, the stator pole is designed to occupy only a portion of a circumference of the winding space in the circumferential direction, and the magnetic return path region has a curved shape which adjoins the at least one pole head, as a result of which the magnetic return path region is designed to define the winding space in part transversely to the circumferential direction.

In relation to a stator, it is proposed in particular that the stator include a plurality of stator poles, wherein the stator poles are arranged at a distance from one another in the circumferential direction, and the stator poles are arranged in such a way that, in the installation position, pole heads of the stator poles are opposite the at least one rotor, and return path regions of the stator poles define the winding space in part transversely to the circumferential direction.

In relation to a transverse flux machine, it is proposed that the machine include a stator.

In relation to a linear machine, it is proposed in particular that the machine include a plurality of stator poles, wherein the stator poles are arranged at a distance from one another along the displacement path, and the stator poles are arranged in such a way that, in the installation position, pole heads of the stator poles are opposite the at least one rotor, and return path regions of the stator poles define the winding space in part transversely to the displacement path.

The disclosure is based, inter alia, on the concept that, as a result of the construction in particular of the stator pole, but also of the stator and the transverse flux machine, the leakage flux may be reduced so that the disadvantageous effects occurring in the prior art may be reduced. In this case, the construction of the stator pole in conjunction with the specific arrangement in the stator makes it possible to reduce the leakage flux. As a result, the performance of the transverse flux machine may be increased, and/or losses may be reduced overall. By the stator pole, an improved claw pole geometry may be produced, which simultaneously also makes it possible to reduce eddy current losses, in particular in the case of a laminated design.

The stator includes a stator winding arranged in a winding space, and the winding space is formed circumferentially in a circumferential direction in relation to an axis of rotation of the at least one rotor of the transverse flux machine. The winding space may thus be in the form of a torus or the like which—depending on the construction—may have a round and/or angular cross-sectional area. In the winding space, the stator winding is arranged along the longitudinal extent thereof in the circumferential direction, more specifically in such a way that one or more electrical conductor elements are arranged in the circumferential direction in the winding space. As a result, a coil structure is achieved which is arranged or formed substantially around the axis of rotation of the at least one rotor in the circumferential direction. The stator winding may be formed circumferentially, and so may the winding space.

The stator pole has a body element made of a ferromagnetic material, which may make it possible to provide the highest possible saturation flux density with the lowest possible eddy current losses. The stator pole may be formed as a single piece. The stator pole may of course also be composed of a plurality of elements which may be interconnected, (e.g., by an adhesive, clamping elements, and/or the like). For this reason, the body element may also be produced at least in part by an additive production method.

The body element has at least one pole head which, in the installation position, may be arranged opposite the at least one rotor, and a magnetic return path region which, in the installation position, may be arranged facing away from the at least one rotor. The pole head may include a widening which makes it possible to orientate the magnetic flux to be guided by the body element or the stator pole in normal operation toward the rotor as advantageously as possible, e.g., in a radial direction in relation to the axis of rotation so that the best possible linking of the magnetic flux of the stator with the magnetic flux of the rotor may be achieved. The permanent magnetic excitation may be provided for example by the flux density of rotor magnets. In this case, the active element is the stator. The magnetic field may be controlled by the current supply thereto. The flux is then linked with the at least one stator winding.

A number of the pole heads of the stator pole corresponds to a number of the rotors of the transverse flux machine. The stator pole is thus specifically designed for the transverse flux machine, more specifically in particular taking into account the number of the rotors of the transverse flux machine. Thus, for each rotor, the stator pole includes a respectively associated pole head. As a result, it is possible, by a respective pole head, to magnetically couple a respectively associated rotor. If only a single rotor is provided in the case of the transverse flux machine, it may be provided that the stator pole also includes only a single pole head.

The body element further has a magnetic return path region which, in the installation position, may be arranged facing away from the at least one rotor. Therefore, although the return path region is connected to the at least one pole head so that a region with good magnetic conductivity may be provided to guide the magnetic flux, the return path region—unlike the pole head—does not need to be specifically designed to achieve linking of the magnetic fluxes between the stator and the rotor. Instead, by the return path region, it is possible for the magnetic flux provided by the stator winding to be supplied to the pole head with a high degree of effectiveness. At the same time, the return path region makes it possible to reduce the magnetic field outside the electrical machine.

The stator pole is designed to occupy only a portion of a circumference of the winding space in the circumferential direction when in the installation position. Therefore, the stator pole may be configured to be segment-shaped. Furthermore, the magnetic return path region has a curved shape which adjoins the at least one pole head, as a result of which the magnetic return path region is designed to define the winding space in part transversely to the circumferential direction. This construction of the stator pole, in addition to allowing good guidance of the magnetic flux in the case of the stator, also makes it possible to simultaneously arrange the stator poles at a distance from one another. Therefore, in addition to good magnetic conductivity, good cooling of the stator and in particular of the stator winding thereof may also be achieved at the same time. The specific construction of the stator pole makes it possible in particular for the stator winding to not need to be completely surrounded by a ferromagnetic material in the circumferential direction, as a result of which the problems that exist in the prior art may arise in the normal operation of the transverse flux machine. The design of the stator pole makes it possible to produce a type of grid structure in order to allow a flow of a cooling fluid between adjacent stator poles. In particular, when the cooling fluid is a gas, for example air, helium or the like, a good cooling effect may be achieved by a conventional cooling fluid so that, e.g., simple, conventional cooling measures may be used with respect to the cooling of the transverse flux machine. As a result, it is also possible to increase the performance of the transverse flux machine overall. In the circumferential direction, the stator poles are accordingly arranged at a distance from one another, as a result of which openings for the cooling fluid to flow through may be provided.

For this purpose, the body element may have a slim contour extending from the pole head over the magnetic return path region. A longitudinal extent of the body element in the radial direction may be greater than a measurement on the air-gap side of the pole head in the axial direction of the axis of rotation or in the circumferential direction.

The curved shape is formed according to the stator winding of the stator, e.g., according to the cross section thereof or according to a cross section of the winding space.

As a result of the curved shape, the magnetic return path region defines the winding space not completely transversely to the circumferential direction, but rather only with respect to a part, for example, with respect to half of the cross section of the winding space or the like. The curved shape may be formed by two interconnected branches which may form an obtuse angle. The curved shape may be round and/or angular. For example, the curved shape may include a circular arc, an elliptical arc, a V shape, a tub shape, a U shape, combinations thereof, and/or the like. The curved shape may be configured to be adapted configured to the winding space or the stator winding. The stator pole or the magnetic return path region therefore includes the winding space or the stator winding only in part.

The body element may include a plurality of ferromagnetic sheets electrically insulated from one another, which are arranged so as to directly adjoin one another in a plane which is spanned by a curve of the curved shape. By this arrangement, the stator pole or the body element thereof may be shaped in such a way that, by the coating of the sheets which is formed thereby, eddy current formation may be suppressed in an improved manner. As a result, it is possible to design the stator pole, in particular the body element thereof, to be laminated in a known manner, as a result of which the advantageous ferromagnetic properties which may be provided by the corresponding sheets may be used without having to accept the disadvantages that arise in the prior art, in particular in relation to eddy currents. As a result, the degree of effectiveness may be further improved overall.

The plane, which is spanned by the curve of the curved shape, is a virtual plane formed perpendicularly to an axis of curvature.

Furthermore, it may be provided that the body element also includes soft magnetic composite as a material at least in part. However, the magnetic properties relating to magnetic conductivity may be more disadvantageous than those of ferromagnetic iron sheets. Of course, a combination with ferromagnetic iron sheets may also be provided in order to be able to better meet requirements in terms of construction. As a result, the application may be further improved overall.

It has proven to be particularly advantageous when the stator pole includes at least two pole heads. A first pole head, in the installation position, is able to be arranged opposite a first rotor, and the magnetic return path region including the second pole head at an end which is opposite the first pole head, the second pole head, in the installation position, being able be arranged opposite a second rotor. Consequently, it is possible for the magnetic flux of the stator winding to act on two rotors simultaneously, as a result of which the efficiency of the transverse flux machine may be considerably increased. Of course, more than two pole heads may also be provided, which may then be arranged in an opposing manner according to respective additional rotors. The effect of the transverse flux machine may thus be further increased overall. Furthermore, the leakage flux may be reduced.

In addition, the stator pole may include an electrical insulating element. By the electrical insulating element, it is possible to better insulate the stator pole in relation to the stator winding or with respect to other additional electrical components of the transverse flux machine. The electrical insulating element may be for example an electrically insulating lacquer, an electrically insulating coating and/or the like. The electrical insulating element may simultaneously also provide protection of the stator pole against external mechanical influences or unfavorable atmospheric influences, for example, as a result of a respective cooling fluid or the like.

With respect to the stator, the stator poles are arranged at a distance from one another in the circumferential direction. As has already been explained, particular properties with respect to the cooling may be achieved as a result. The stator poles are further arranged in such a way that pole heads of the stator poles, in the installation, are opposite the at least one rotor, and return path regions of the stator poles define the winding space in part transversely to the circumferential direction. As a result, the winding space is not completely surrounded by a respective stator pole. As a result of good flux linkage, the winding of the winding space may also be cooled in an improved manner. By the arrangement of the stator poles and the design or structure thereof, the winding space is designed to be open in part, and thus easily accessible for a cooling fluid.

According to one development, it is proposed that the stator poles be arranged in the circumferential direction in such a way that the magnetic return path regions thereof alternately define a respective opposing region of the winding space transversely to the circumferential direction. The stator poles are thus arranged in the winding space alternately along the circumferential direction so that a return path region alternately defines the winding space in part in a different region in each case. In this case, when viewed in the circumferential direction, the return path regions may overlap one another at least in part in the end regions thereof, which also include the respective pole heads.

The magnetic return path regions are formed as to be adapted in terms of the cross section thereof, according to material properties, to the flux to be guided in the normal operation of the transverse flux machine.

Furthermore, it is proposed that the winding space include a first circumferential subspace and a second circumferential subspace at a distance therefrom axially. The stator winding includes a first partial winding arranged in the first subspace, and a second partial winding arranged in the second subspace. The first partial winding and the second partial winding are electrically coupled to one another in such a way that the same electric current is supplied thereto. As a result, a single coil may be formed. Furthermore, the stator and thus also the transverse flux machine may be constructed modularly in a simple manner so that the performance thereof may be adapted as required. This configuration is of course not limited to providing only two partial windings which are arranged axially relative to one another. Depending on requirements, three or more windings may also be provided, wherein the three partial windings are arranged at a distance from one another axially, to which partial windings the same electric current is correspondingly supplied. The at least one rotor may be configured to be correspondingly adapted so that good use may be made of the total magnetic flux provided. As a result, transverse flux machines may be provided which may be supplemented in the axial direction as needed in order to adapt the performance thereof to a specific application.

According to another development, it is proposed that the first partial winding and the second partial winding be electrically coupled to one another in such a way that the same electric current is supplied to the partial windings in opposite directions in the circumferential direction. As a result, it is possible to connect the partial windings only in series, by which the partial windings may be supplied with the same electric current. It may thereby be provided that the partial windings need to be coupled to a single associated control unit which provides the corresponding electric current for the partial windings. This configuration is therefore particularly advantageous in terms of control. For this purpose, the first and the second partial winding may correspondingly be connected in series, for example, by winding heads arranged axially and opposite one another in the circumferential direction.

According to one development, it is proposed that the winding space include at least two segment spaces arranged adjacently to one another in the circumferential direction, and that the stator winding include respective segment windings arranged in the segment spaces. This configuration is particularly suitable for transverse flux machines configured to be connected to a polyphase alternating current network. The number of segment spaces or segment windings may correspond to the number of phases of the alternating current network to which the transverse flux machine or the stator winding thereof is to be coupled. As a result, further improvement may be achieved.

Furthermore, it is proposed that, during segmentation, the segment windings of respective partial windings of respective subspaces which are arranged at a distance from one another axially be connected in series in an opposing region in the circumferential direction. This means that the segment spaces arranged opposite or adjacently to one another in the axial direction include segment windings which are each connected in series. As a result, the modular construction may also be achieved in a simple manner for polyphase transverse flux machines.

Furthermore, it is proposed that the stator winding include a plurality of electrical conductor elements arranged at a distance from one another. The conductor elements may be formed by conductor bars, conductor wires, or the like, which may be formed from an electrically conductive material such as copper, aluminum, silver, alloys thereof, carbon nano-tube yarn, and/or the like. The conductor elements may be arranged at a distance from one another in such a way that the cooling fluid may flow around the elements at least in part. Good cooling of the conductor elements may thus be achieved so that the efficiency of the transverse flux machine may be further increased overall.

With respect to the transverse flux machine, it is further proposed that the machine include two rotors arranged coaxially with one another and at a distance from one another radially, the stator being arranged radially between the rotors. The rotors may be arranged in a same location in the axial direction or in a same region in the axial direction. As a result, the magnetic flux provided by the stator may be used particularly effectively so that a particularly high degree of effectiveness of the transverse flux machine may be achieved. In particular, two air gaps may result in a large force-transmitting surface. The magnetic power density (Maxwell voltages) may thus be used for more torque. The rotors may thus be mechanically interconnected so that they have the same speed. It is of course possible, if needed, to provide a construction in which the rotors may also rotate independently of one another. If necessary, rotors and stators may be correspondingly designed in terms of construction. As a result, the transverse flux machine may be used in a more flexible manner.

It is further proposed that the stator winding include at least two circumferential partial windings formed at a distance from one another axially, and that at least one rotor be arranged for each of the partial windings. As a result, the transverse flux machine may be further improved with respect to the efficiency and/or flexibility thereof. Moreover, it is possible to improve a modular construction of the transverse flux machine as a whole so that depending on the application and the performance requirements, corresponding machine modules, which may each include one stator winding and two rotors, may be provided. The flexibility with respect to the construction of the transverse flux machine and adaptation to respective applications may thus be further improved.

Overall, by the disclosure, it may thus be provided that the transverse flux machine may have double rotors including surface magnets.

Additionally, or alternatively, the transverse flux machine may have claw-pole stator including curved stacks of sheets in which the lamination is oriented as parallel as possible to the three-dimensional main flux and to the rotor and stator leakage flux in order to define eddy currents.

Additionally, or alternatively, the transverse flux machine may have direct air cooling of the winding with a short thermal path for cooling and the option of forced convection.

Additionally, or alternatively, in the case of the embodiment with partial windings, the cooling fluid may flow through the partial windings axially in series, in particular in the case of forced cooling (wherein heating of the cooling medium, for example cooling air, may thus be limited, and a heat transfer may thus be made possible in the case of a subordinate partial winding).

Additionally, or alternatively, with respect to the rotor, a Halbach array of the magnets may be provided, which may be segmented and attached to a rotor structure which has poor electrical and/or magnetic conductivity in order to minimize eddy current losses. As a result, complexity relating to cooling structures on the rotor and weight potentially caused thereby may be reduced or even completely avoided.

Further, by positive fits of the magnetic components on the mechanical rotor and stator structure, a height of the two air gaps may be reduced, as a result of which the torque may be increased.

Also, a three-phase configuration may be achieved for the transverse flux machine, in that segment windings are provided in the stator, wherein respective winding heads of the segment windings may be surrounded by respective end-face stator poles so that maximum use may be made of installation space.

Moreover, for the double-rotor configuration, as a result of this construction, a leakage flux of the stator overcomes the distance of the stator poles or a claw distance twice, which, in the case of a configuration with only one air gap, needs to be overcome only once. Accordingly, a power factor may be increased by the second air gap and complexity for the energy supply of the transverse flux machine may be designed in an improved manner with respect to weight and losses. In addition, by the second air gap, a power density, (e.g., a gravimetric power density of the electrical machine), may be increased because a corresponding material may be reduced or omitted for a return path in the stator.

The construction of the stator poles, (e.g., with respect to the laminated design made of iron sheets), may considerably reduce the eddy currents, in particular those eddy currents which may be caused by a three-dimensional direction of the magnetic flux of the transverse flux machine. As a result, particularly high torque densities may be achieved, in particular as a result of a particularly fine pole pitch which may be achieved by the disclosure, specifically in particular also in relation to an average speed range. As a result, the use of the transverse flux machine in relation to direct drives may be expanded.

In relation to the double-rotor configuration, a double air gap may be produced, as a result of which the magnetic resistance for stray fields of the stator may be doubled, by which the flux thereof may be for example almost halved. As a result, the power factor, which describes a ratio of a magnetic main flux to a magnetic leakage flux, may increase. Furthermore, as a result, a leakage power of the transverse flux machine and complexity with respect to the power supply and the cabling may be reduced.

The construction further allows direct fluid cooling, in particular air cooling of the stator winding, for example, by forced fluid flow. A conductor geometry of conductor elements of the stator winding may be designed to be adapted to the flow of the cooling fluid and the heat transfer to the cooling fluid. By the large surface area for a heat transfer which may be achieved thereby and a short thermal path brought about thereby, namely only from the inside of the respective conductor to the surface thereof, for example, the surface insulation thereof, highly efficient cooling may be achieved with respect to the cooling capacity and the mass.

Moreover, with respect to the rotor, rotor magnets may be provided in a Halbach array, more specifically without the additional ferromagnetic material being provided on a carrier structure which has low electrical conductivity, so that eddy current losses in the rotor may be minimized, and the weight of the transverse flux machine may be reduced overall. At the same time, a torque density may be increased.

Interlocking connections of the stator poles and of the rotor magnets make it possible, for example, to reduce the magnetic air gap and thus the magnetic resistance. As a result, an area-specific tangential force may be increased.

In the case of a three-phase configuration with three segment windings in the circumferential direction, a magnetomotive force may be used both by supply conductors and by return conductors of the stator winding for torque generation. By an encompassing arrangement of the stator poles, a usable force may also be generated on respective winding heads. Between the winding heads, an installation space may be used to achieve a spatial separation between the phases and to meet safety requirements.

For this reason, with respect to the magnetic circuit thereof, the transverse flux machine may also be produced with only a single air gap, thereby achieving a lower torque density and a lower power factor.

Although direct fluid cooling is advantageous, in particular, for an application in aviation, alternative embodiments may also be provided, such as: liquid cooling directly on the conductor element; liquid cooling with a hollow conductor; gas cooling with a hollow conductor; liquid cooling on the casing, in particular in the case of a configuration with an air gap; gas cooling on the casing; or two-phase cooling of the stator.

The rotor construction may also be produced by a sheet-metal structure under conventionally magnetizable magnets. A flux accumulator array of north/south magnets including tangential intermediate sheet-metal regions may also be provided.

The magnetic components may be held in the region of the air gap without an interlocking fit, but this may result in an increase in an effective air-gap length, as a result of which the torque may be lower, and the leakage flux may be greater.

The stator poles may also be produced from multi-component composite materials manufactured in additive processes, in which one component may include a highly permeable material and another component may include an electrically insulating material. By the insulating material, eddy current barriers may be introduced into the compound structure so that magnetic losses may be further reduced.

By the construction of the stator poles, in particular a one-dimensional main flux guide into the stator poles, (e.g., a grain-oriented iron/silicon sheet metal), may be used as a material.

A three-phase transverse flux machine may also be produced in that three axial partial windings arranged one behind the other are provided. In this case, no return conductors need to be provided, because the respective stator partial windings extend beyond the circumference in the circumferential direction without requiring separate connections.

The transverse flux machine may also be designed for a smaller or greater number of phases.

For this reason, the same pole pair arrangement may also be used to produce an electrical machine having two air gaps with an axial normal vector of the air gap areas, in which, for example, coil sides may be radially offset.

The advantages and effects indicated for the stator pole also apply equally to the stator, the transverse flux machine, and to the linear machine and vice versa.

BRIEF DESCRIPTION OF THE DRAWINGS

Further features, advantages, and effects may be found in the following exemplary embodiments with reference to the drawings. In the drawings, the same reference signs denote like features and functions, in which.

DETAILED DESCRIPTION

Figure 1:
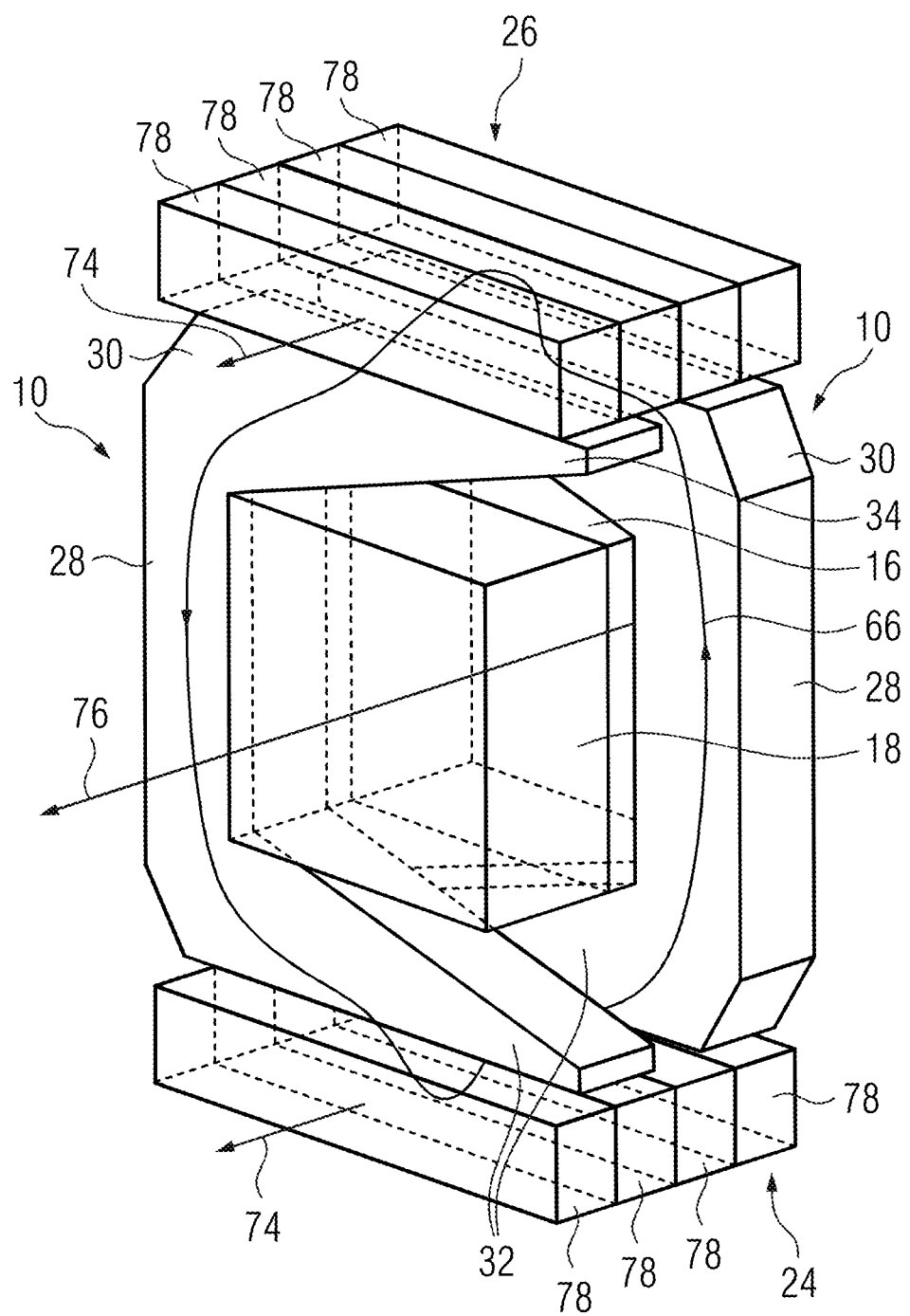
FIG. 1 is a schematic perspective view of an example of a cut-out of a transverse flux machine, including an inner rotor, an outer rotor, and two stator poles arranged adjacently to one another.
Figure 2:
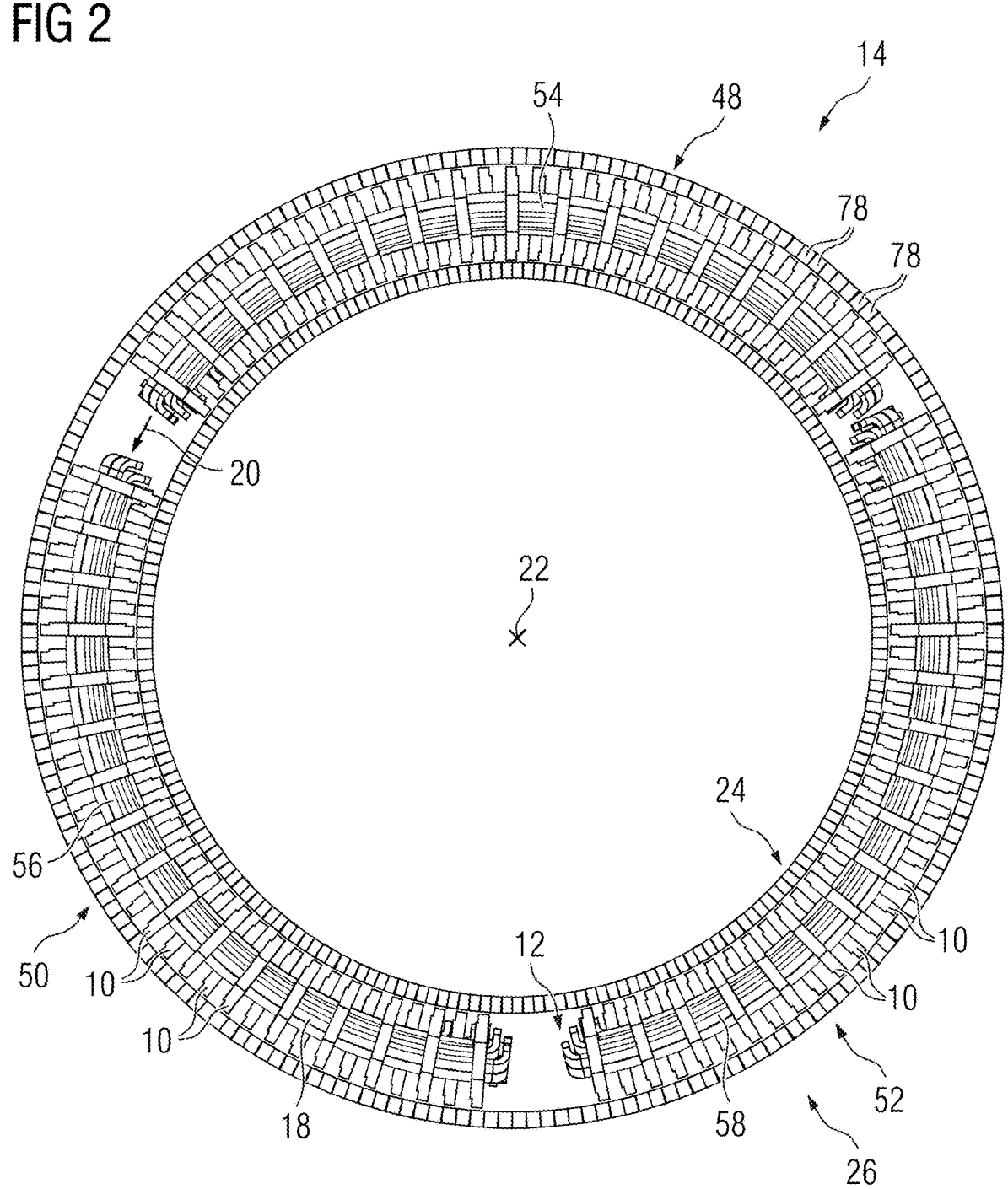
FIG. 2 is a schematic plan view of an example of a transverse flux machine, including a stator, an inner rotor, and an outer rotor.

FIG. 2 shows a schematic drawing in a plan view of an axial end face of a transverse flux machine 14, including a stator 12 which has a stator winding 18 arranged in a winding space 16 (FIG. 1). The transverse flux machine 14 further includes two rotors arranged so as to be able to rotate relative to the stator 12, namely an inner rotor 24 and an outer rotor 26, which in the present configuration are mechanically coupled to one another for conjoint rotation. In alternative configurations, these rotors may also be rotatable independently of one another. The winding space 16 is formed circumferentially in a circumferential direction 20 in relation to an axis of rotation 22 of the rotors 24, 26.

In a known manner, the rotors 24, 26 include, on the surfaces thereof facing the stator 12, magnet assemblies which, in the present configuration, are designed according to a Halbach array, as disclosed in EP 2 605 367 A1. In alternative configurations, the arrangement of the magnets may also be selected differently. In the present case, the magnets are formed by permanent magnets. Alternatively or additionally, in this case, separately excited magnets may also be provided. The magnets are arranged substantially adjacently to one another in the circumferential direction 20 and identified by the reference sign 78.

In the configuration of the transverse flux machine 14 shown in FIG. 2, the stator winding 18 has a segmented design. For this purpose, the winding space 16 is divided up into three segment spaces 48, 50, 52, which are arranged adjacently to one another in the circumferential direction. In each of the segment spaces 48, 50, 52, a respective segment winding 54, 56, 58 is arranged, as will be described in greater detail below. In the present configuration, it is provided that the transverse flux machine 14 is designed for operation with a three-phase AC voltage. For this purpose, a respective phase of the AC voltage is supplied to each of the segment windings 54, 56, 58. The AC voltage is thus a three-phase AC voltage.

From FIG. 2, it may further be seen that, in addition to the stator winding 18 arranged in the winding space 16, the stator 12 includes a plurality of stator poles 10 arranged adjacently to one another in the circumferential direction 20. Two of the stator poles 10 arranged adjacently to one another are shown in a schematic perspective view in FIG. 1.

From FIG. 1, it may be seen that the stator poles 10 each include a body element 30 which is made of a ferromagnetic material. In the installation position, the body element 30 includes two pole heads 32, 34 arranged opposite the respective rotors 24, 26, and a magnetic return path region 28 which, in the installation position, is arranged facing away from the rotors 24, 26. A number of the pole heads 32, 34 of the stator pole 10 corresponds to a number of the rotors 24, 26. In each case, precisely one pole head 32, 34 is thus assigned to a respective rotor 24, 26 or arranged opposite the rotor.

The stator pole 10 is designed, in the installation position, to occupy only a portion of a circumference of the winding space 16 in the circumferential direction 20. The portion may be relatively small in comparison with the circumference. The portion may be designed as required according to the application. The magnetic return path region 28 has a curved shape which adjoins the two pole heads 32, 34, as a result of which the magnetic return path region 28 is designed to define the winding space 16 in part transversely to the circumferential direction 20. In the present configuration, it may be seen that two adjacent stator poles 10 together completely encompass the winding space 16. The adjacently arranged stator poles 16 are arranged at a distance from one another in the present configuration so that, in the circumferential direction, an air gap is formed between adjacently arranged stator poles 10. The air gap may correspond approximately to the extent of a respective stator pole 10 in the circumferential direction.

FIG. 1 further shows that a magnetic main flux 66 is formed in normal operation. This leads to a power 74 as shown in FIG. 1 when an electric current 76 flows in the stator winding 18. For this reason, the functional principle of the transverse flux machine 14 is known to a person skilled in the art, and therefore further detailed explanations in this regard will be dispensed with.

Figure 3:
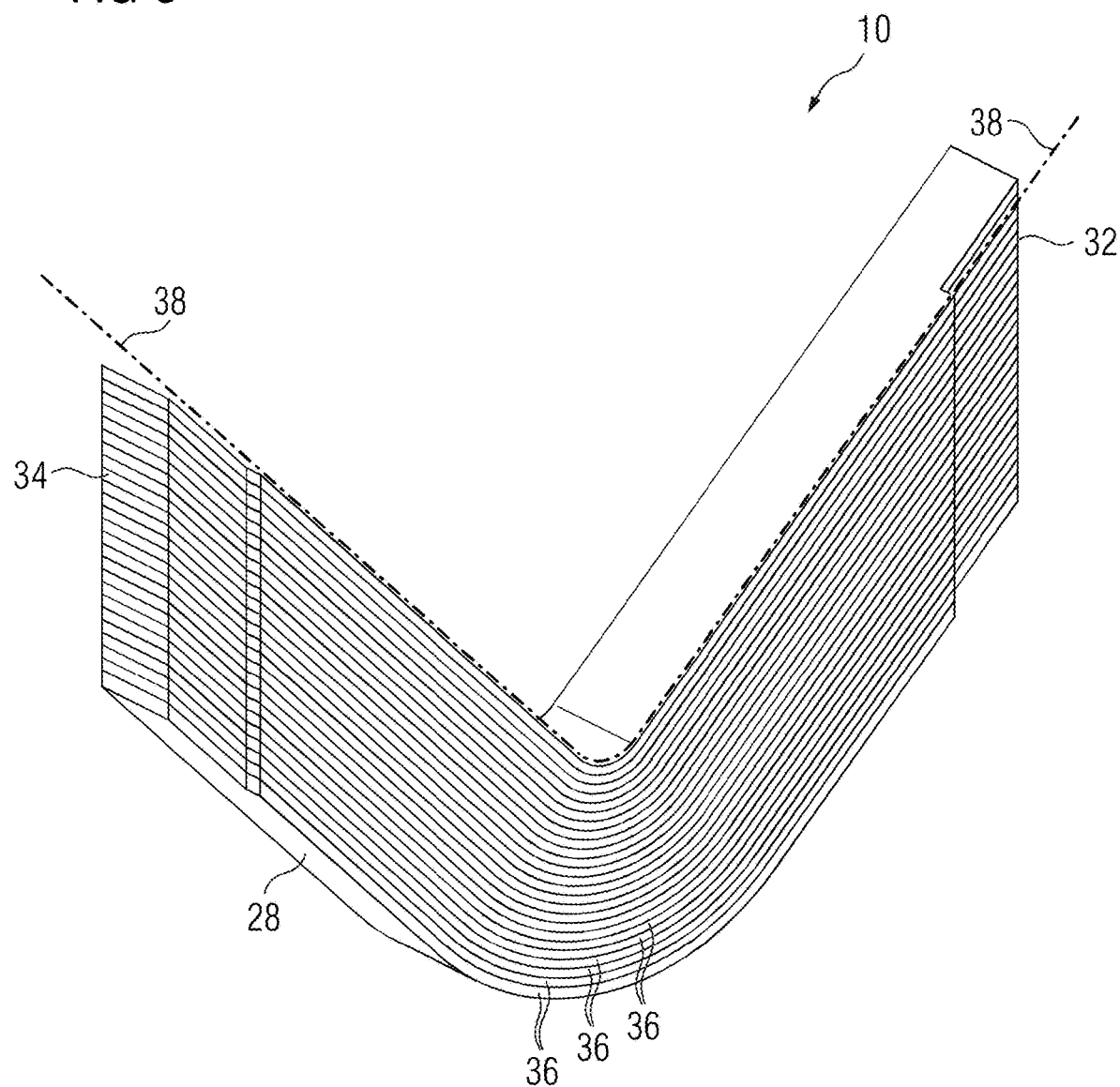
FIG. 3 is a schematic perspective view of an example of a stator pole of a stator of the transverse flux machine according to FIG. 2.

FIG. 3 is a schematic perspective view of one of the stator poles 10 as used in the transverse flux machine 14 according to FIG. 2. FIG. 3 shows that the body element 30 includes a plurality of ferromagnetic sheets 36 electrically insulated from one another, which are arranged so as to directly adjoin one another in a plane 38 spanned by a curve of the curved shape. As a result of this type of curve of the iron sheets 36, the eddy currents may be suppressed advantageously because the curve allows good adaptation to the actual course of the magnetic flux. As a result, it is possible to achieve low eddy current losses with iron sheets as well. FIG. 3 further shows the two pole heads 32, 34.

Figure 6:
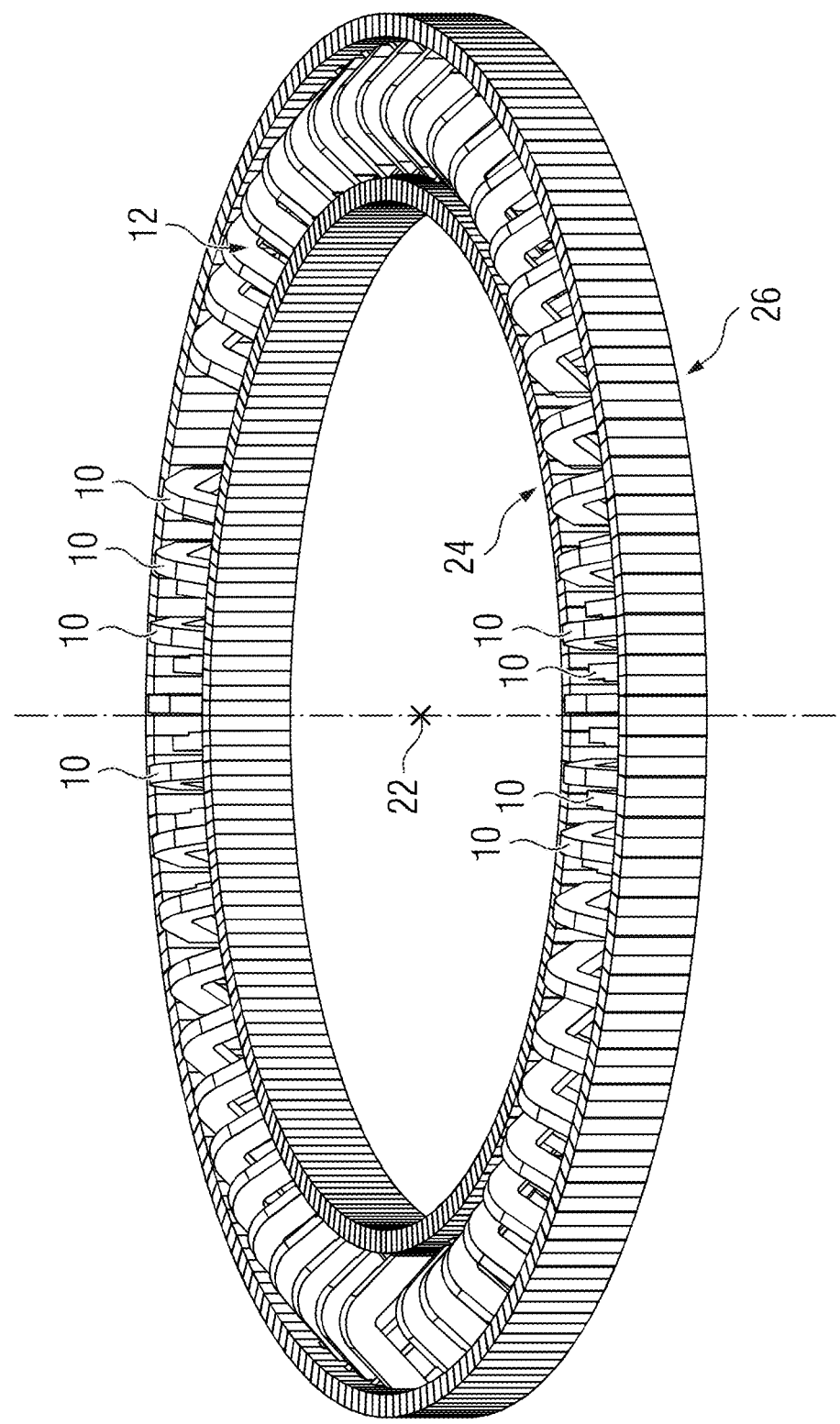
FIG. 6 is a schematic perspective view of the transverse flux machine according to FIG. 2.

FIG. 6 is another schematic perspective view of the transverse flux machine 14 according to FIG. 2.

Figure 7:
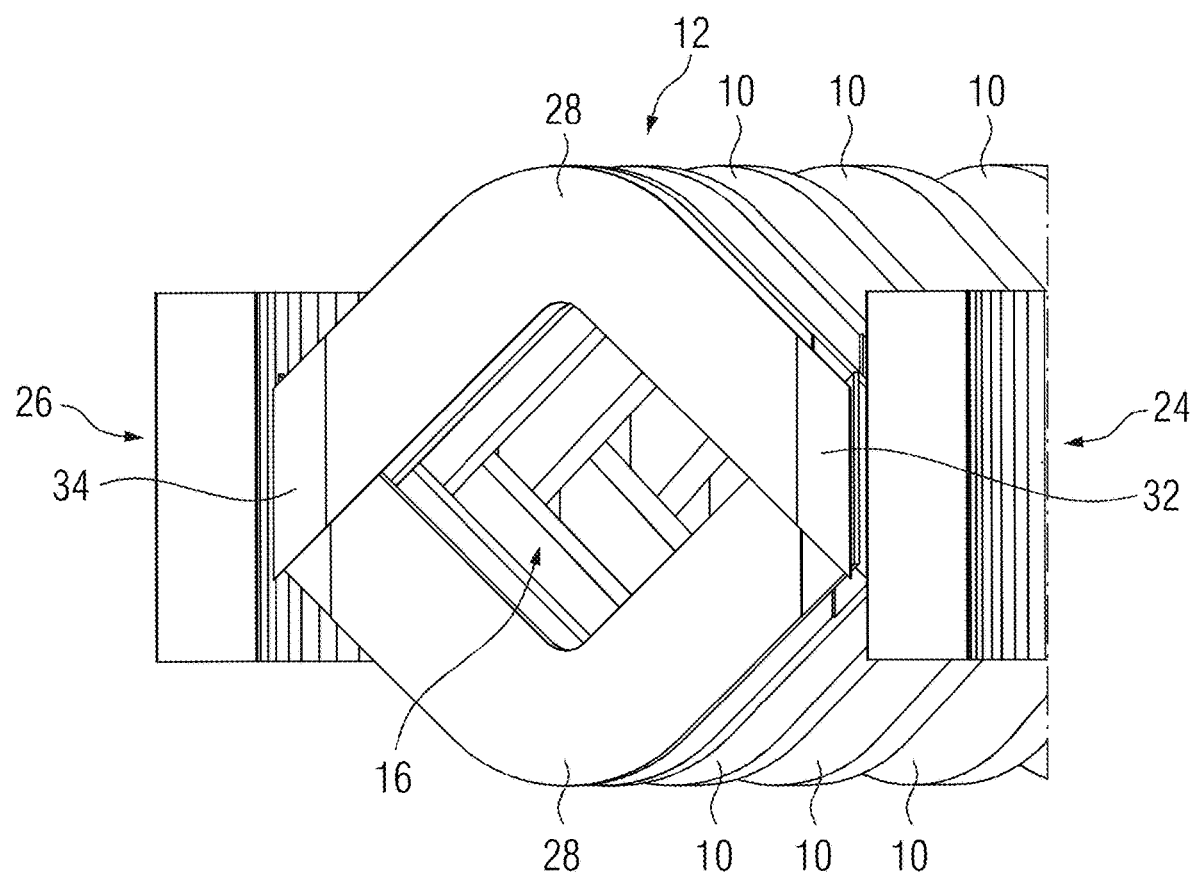
FIG. 7 is another schematic perspective view of a cut-out of the transverse flux machine according to FIG. 6.

FIG. 7 is a schematic perspective cut-out view from FIG. 6 of the arrangement of the stator poles 10 without the stator winding 18. The stator poles 10 are arranged adjacently to one another form the winding space 16 in which, in the installation position, the stator winding 18 is arranged. In the present configuration, the winding space 16 has a substantially rectangular design. If necessary, however, the cross-sectional area may also have a different contour, (e.g., round, triangular, polygonal, combinations thereof, or the like).

Figure 4:
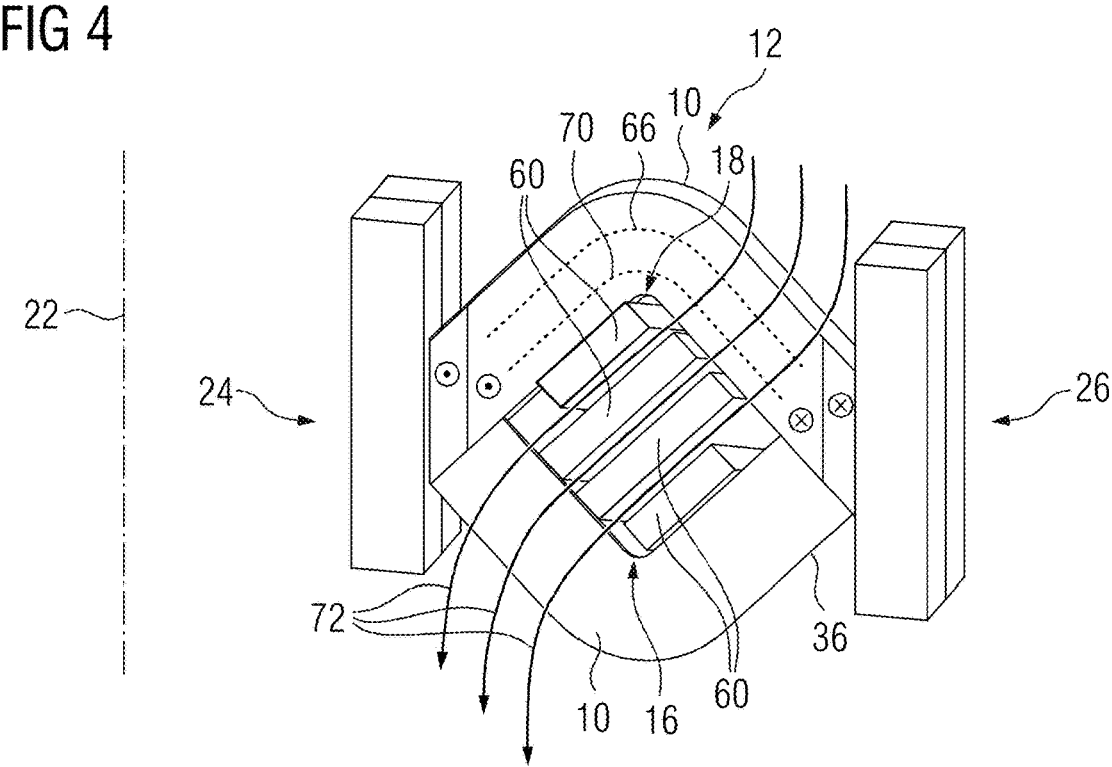
FIG. 4 is a schematic perspective view as in FIG. 1 but for the stator pole according to FIG. 3.

FIG. 4 shows a cut-out from FIG. 7 in which the stator winding 18 is arranged. In the present case, the stator winding 18 includes a plurality of conductor elements 60 arranged at a distance from one another to which, in the normal operation of the transverse flux machine 14, an electric current is supplied in a predeterminable manner. Gaps are formed between adjacent conductor elements 60, through which cooling air 72 flows. As a result, very good cooling of the transverse flux machine 14, in particular of the stator 12, may be achieved overall.

Figure 5:
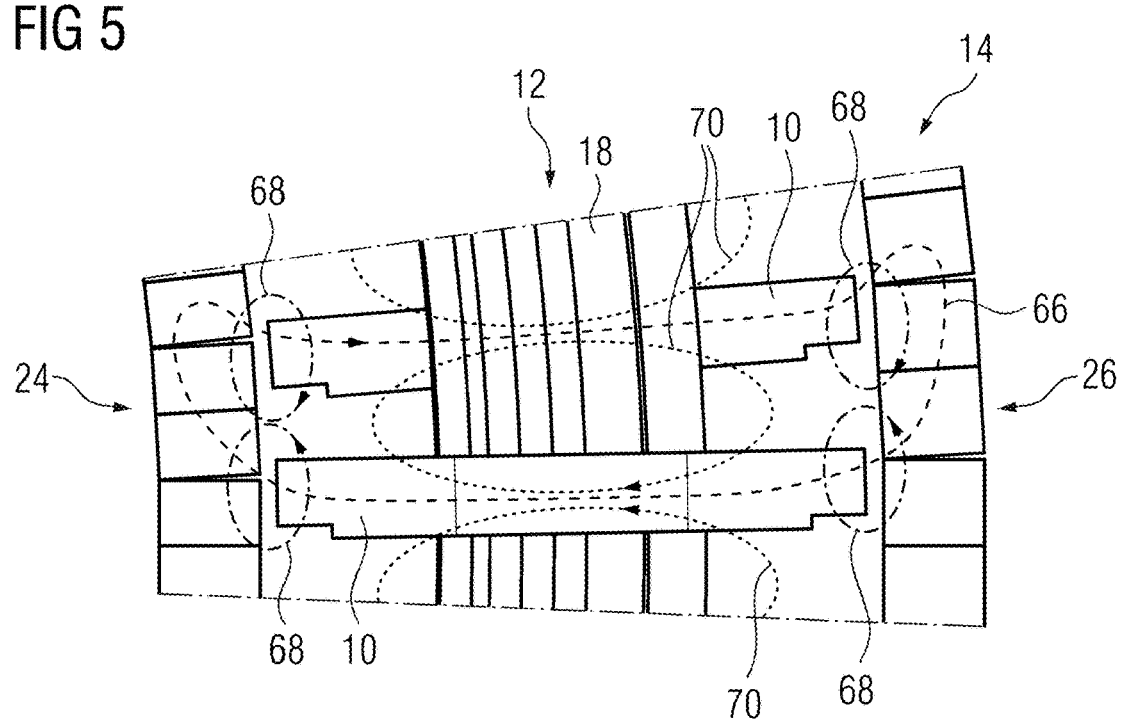
FIG. 5 is a plan view of the drawing according to FIG. 4 which shows magnetic fluxes.

FIG. 5 is a schematic plan view of the drawing according to FIG. 4 as to how magnetic fluxes are formed in normal operation. The reference sign 66 identifies a magnetic main flux. The reference sign 70 relates to the drawing of a magnetic leakage flux in the stator 12. The reference sign 68 relates to a magnetic leakage flux in the rotors 24, 26. As a result of the construction of the stator poles 10 and the arrangement thereof in the stator 12, the magnetic leakage flux may be reduced in comparison with the prior art. Moreover, inter alia, by the Halbach array of the magnets of the rotors 24, 26, the magnetic leakage flux in the rotors 24, 26 may be correspondingly reduced. These magnetic fluxes are also shown in part in FIG. 4. As a result, by the specific arrangement and construction of the stator poles 10 in the stator 12, leakage fluxes may be reduced, and the effect of the main flux 66 may be improved.

The stator poles 10 are arranged in the circumferential direction in such a way that the magnetic return path regions 28 thereof alternately define a respective opposing region of the winding space 16 transversely to the circumferential direction 20. This may be seen in particular in FIGS. 1, 4, 5, and 7.

Figure 8:
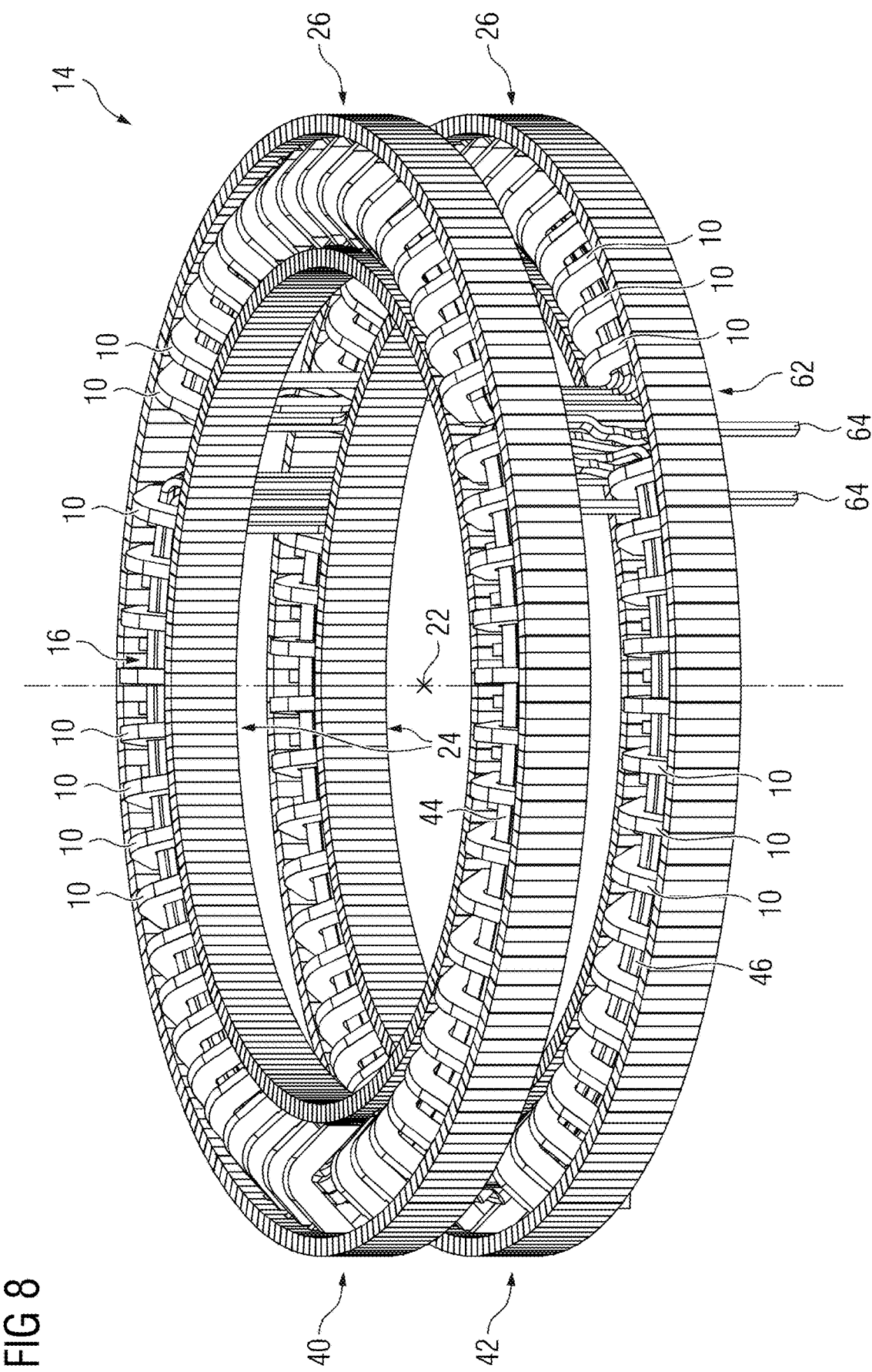
FIG. 8 is a schematic perspective view of an example of another transverse flux machine as in FIG. 6, but with two stators and rotor pairs arranged at a distance from one another axially.

FIG. 8 shows another configuration of the transverse flux machine 14 in which the winding space 16 includes a first circumferential subspace 40 and a second circumferential subspace 42 arranged at an distance therefrom axially. The stator winding 18 includes a first partial winding 44 arranged in the first subspace 40 and a second partial winding 46 arranged in the second subspace 42. The first partial winding 44 and the second partial winding 46 are electrically coupled to one another in such a way that the same electric current is supplied thereto. In the present configuration, it is provided that the same electric current 76 is supplied to the partial windings 44, 46 in opposite directions in the circumferential direction 20.

Figure 9:
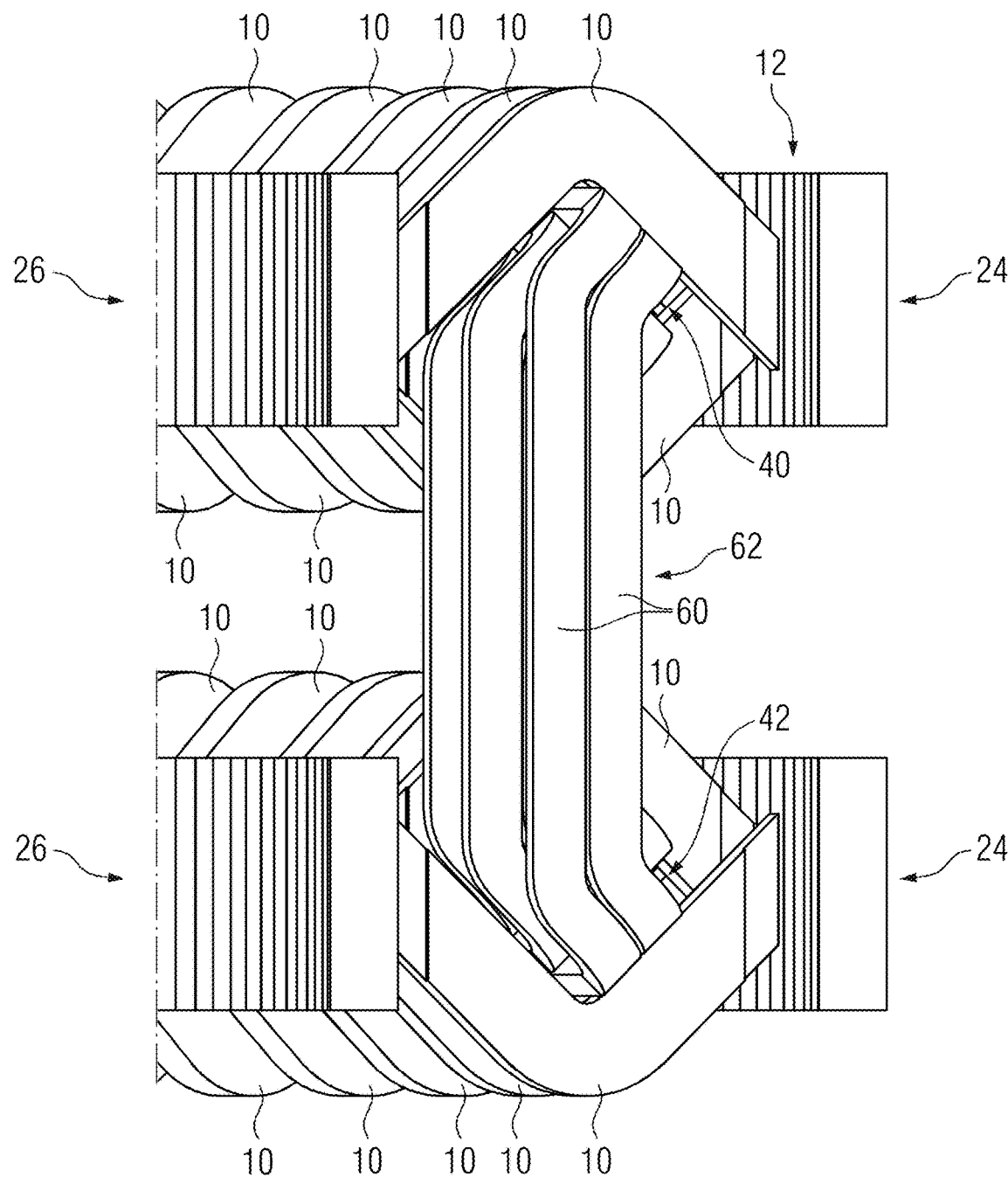
FIG. 9 is a schematic perspective view as in FIG. 7 of a winding head of the transverse flux machine according to FIG. 8.

Accordingly, the transverse flux machine 14 according to the schematic drawing according to FIG. 8 includes both two inner rotors 24 and two outer rotors 26. FIG. 9 is a schematic view of a cut-out of the stator 12 in a perspective detailed view in the region of a winding head 62. In the region of the winding head 62, the first and second partial windings 44, 46 are connected in series by additional conductor elements 60 so that the desired current direction into the respective partial windings 44, 46 may be achieved in a simple manner. The reference sign 64 indicates a winding termination of the stator winding 18.

From FIG. 8, it may further be seen that the transverse flux machine 14, as shown in FIG. 2, is segmented. FIG. 11 is a schematic perspective view of a cut-out of the stator winding 18 of the transverse flux machine 14 according to FIG. 10 in the region of the winding head 62. For clarity, the rotors 24, 26 are not shown in this drawing. Each of the partial windings 44, 46 is thus also correspondingly segmented. Additionally, reference is thus made to the configurations above, in particular in relation to FIG. 2.

Figure 13:
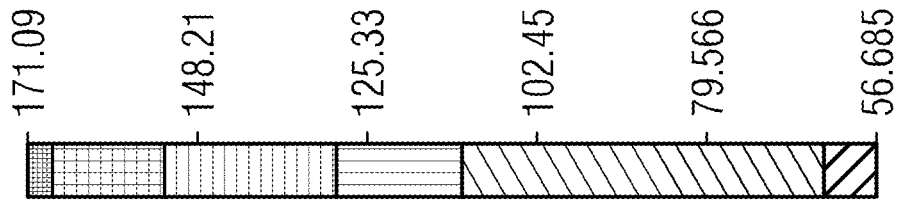
FIG. 13 is a schematic view of an example of a temperature allocation of conductor elements of the stator winding.
Figure 12:
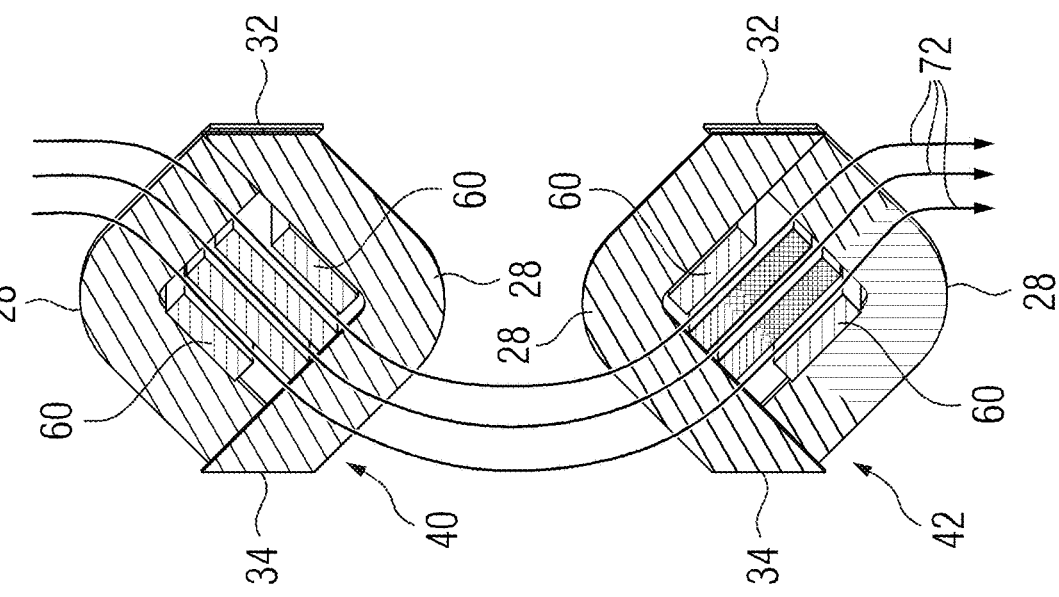
FIG. 12 shows a cut-out from FIG. 10 in a schematic perspective view, in which a cooling air flow is shown.

FIG. 12 is a schematic perspective view of a cut-out of the stator 12 of the transverse flux machine 14 according to FIG. 8, wherein in the respective subspaces 40, 42, conductor elements 60 are arranged at a distance from the segmented partial windings, through which cooling air 72 flows. As a result of the arrangement of the conductor elements 60, the cooling air 72 may flow through the spaces provided by the distances between adjacent conductor elements 60. Good cooling may thus be achieved. The cross-sectional areas shown in FIG. 12 are shown shaded according to temperature. The respective shades are correspondingly allocated to temperature values in the legend according to FIG. 13. From this drawing, it may be seen that the middle conductor ends of the partial winding 42 reach the highest temperature in normal operation, in the present case approximately 171° C.

Figure 10:
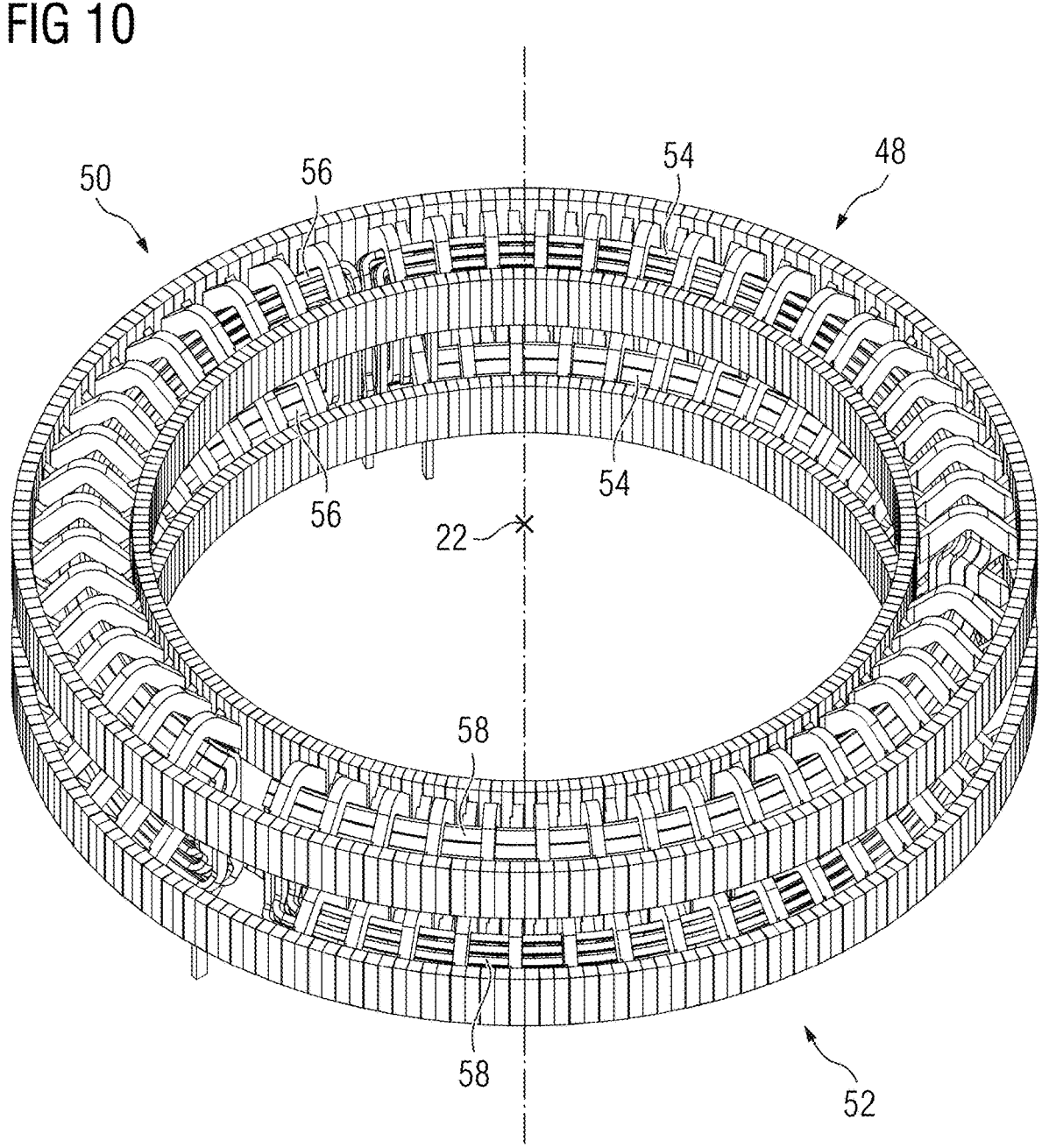
FIG. 10 is a schematic perspective view of the transverse flux machine according to FIG. 9, in which a segmentation of the stator windings in the circumferential direction may be seen.
Figure 11:
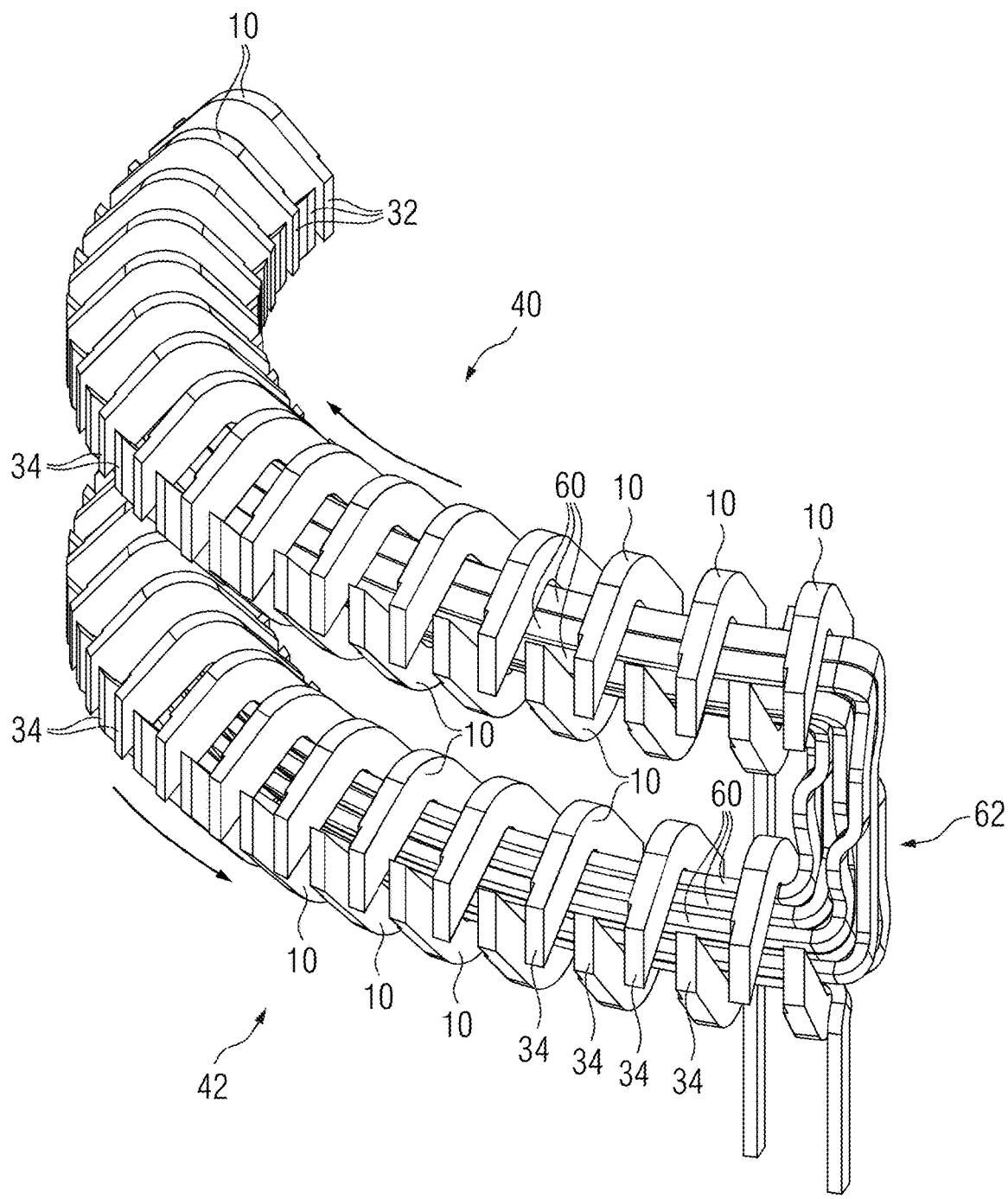
FIG. 11 shows a cut-out of the stator winding according to FIG. 10 in a perspective schematic view.
Figure 14:
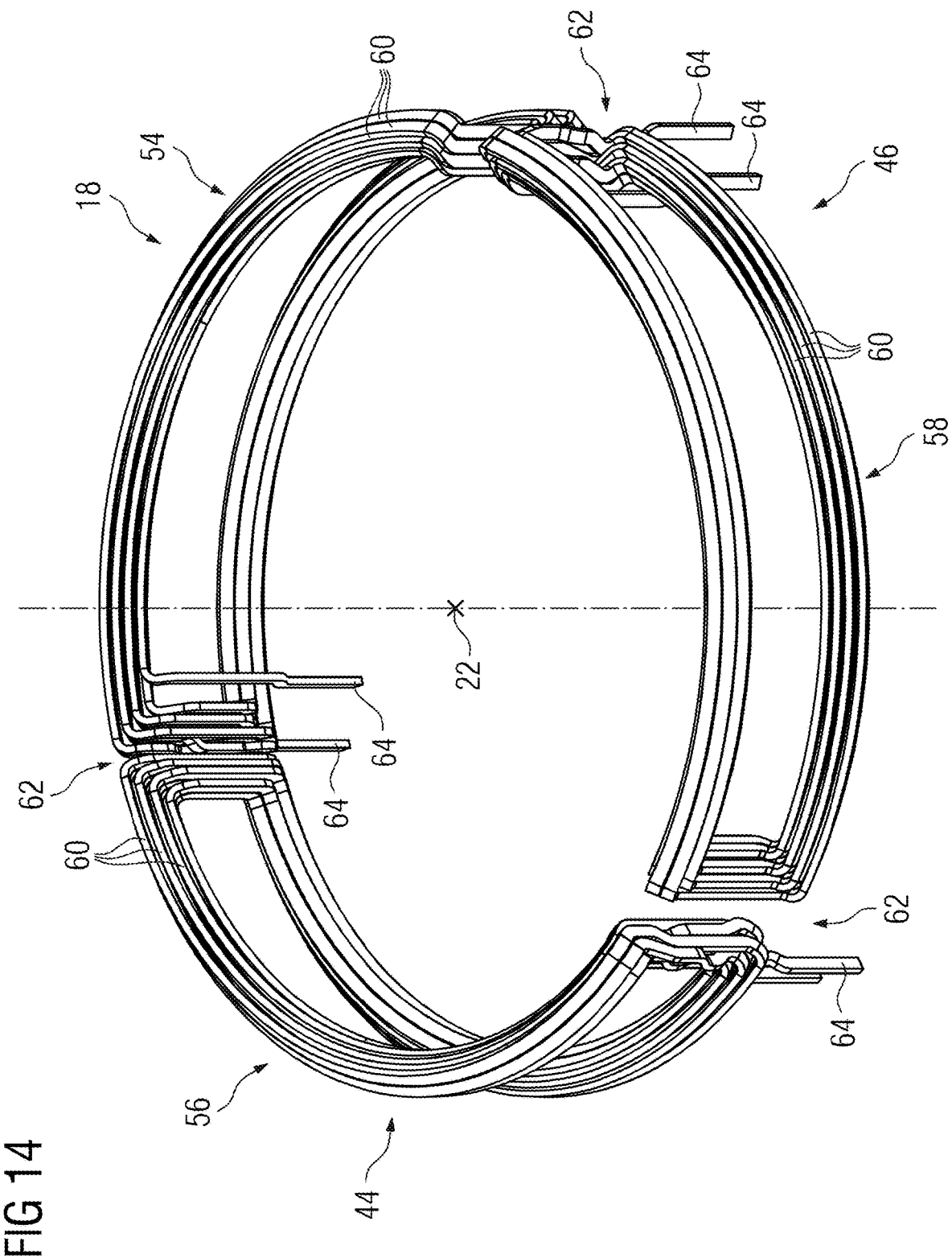
FIG. 14 is a schematic perspective view of the stator winding of the transverse flux machine according to FIG. 10.

FIG. 14 shows the stator winding 18 of the transverse flux machine 14 according to FIGS. 8 and 10 without additional elements. The segmentation of the stator winding 18 into the segment spaces 48, 50, 52 including the segment windings 54, 56, 58 should be noted, wherein at the same time, subspaces 40, 42 are formed which include respective portions of the segment windings 54, 56, 58. In this case, a combination of partial windings and segment windings is thus provided. In the present configuration, three segment windings 54, 56, 58 are provided which may be connected to respective phases of a three-phase AC voltage by the winding terminations 64 thereof. For a respective segment winding of the segment windings 54, 56, 58, the associated partial windings are each connected in series so that, in normal operation, in each of the segment windings 54, 56, 58, the current direction of the electric current 76 is in the circumferential direction 20 in one case and opposed to the circumferential direction 20 in one case. Inside one of the partial windings 44, 46, the respective direction of the electric current 76 is the same, but temporally offset according to the respective phase position of the respective phases of the AC voltage.

Overall, a transverse flux machine may thus be achieved which has improved efficiency, e.g., a higher torque density and advantageous efficiency as well as an improved power factor. In this case, the formation of the stator poles and the arrangement thereof in the stator are of particular importance, as these allow improved guidance of the magnetic flux.

The exemplary embodiments are used solely to explain the disclosure and are not intended to restrict the latter. In particular, the disclosure is of course not limited to including only two partial windings in the axial direction at a distance from one another, but rather more than two partial windings may also be provided. Moreover, the same also applies to the segment windings, the number of which is not set as three. Of course, it is also possible for only two segment windings or more than three segment windings to be provided in the circumferential direction, depending on what is advantageous for a specific application. It is clear to a person skilled in the art how to make the corresponding adaptations in a simple manner.

Although the disclosure has been illustrated and described in greater detail by the exemplary embodiments, the disclosure is not restricted by these exemplary embodiments. Other variations may be derived herefrom by the person skilled in the art, without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A stator pole for a stator of a transverse flux machine, the stator comprising a stator winding arranged in a winding space, and the winding space being formed circumferentially in a circumferential direction in relation to an axis of rotation of at least one rotor of the transverse flux machine, the stator pole comprising:
a body element having a ferromagnetic material, wherein the body element has at least one pole head which, in an installation position, is configured to be arranged opposite the at least one rotor, and a magnetic return path region which, in the installation position, is configured to be arranged facing away from the at least one rotor,
wherein the body element comprises a plurality of ferromagnetic sheets electrically insulated from one another, wherein the ferromagnetic sheets are arranged so as to directly adjoin one another in a plane spanned by a curve of a curved shape,
wherein a number of the pole heads of the stator pole correspond to a number of the rotors,
wherein the stator pole is configured to occupy only a portion of a circumference of the winding space in the circumferential direction when in the installation position, and
wherein the magnetic return path region has a curved shape which adjoins the at least one pole head, as a result of which the magnetic return path region is configured to define the winding space in part transversely to the circumferential direction.

2. The stator pole of claim 1, wherein the at least one pole head comprises a first pole head and a second pole head,
wherein the first pole head, in the installation position, is configured to be arranged opposite a first rotor of the at least one rotor,
wherein the magnetic return path region has the second pole head at an end opposite the first pole head, and
wherein the second pole head, in the installation position, is configured to be arranged opposite a second rotor of the at least one rotor.

3. The stator pole of claim 1, further comprising:
an electrical insulating element.

4. A stator for a transverse flux machine, the stator comprising:
a stator winding arranged in a winding space of the stator, the winding space being formed circumferentially in a circumferential direction in relation to an axis of rotation of at least one rotor of the transverse flux machine; and
a plurality of stator poles, each stator pole of the plurality of stator poles comprising a body element having a ferromagnetic material, wherein the body element has at least one pole head and a magnetic return path region,
wherein the stator poles are arranged at a distance from one another in the circumferential direction,
wherein the stator poles are arranged in such a way that pole heads of the stator poles are opposite the at least one rotor in an installation position,
wherein adjacent stator poles are arranged in such a way that pole heads of a first stator pole of the adjacent stator poles are positioned in an opposite direction from pole heads of a second stator pole of the adjacent stator poles,
wherein each stator pole is configured to occupy only a portion less than all of a circumference of the winding space in the circumferential direction when in the installation position, and
wherein magnetic return path regions of the stator poles have curved shapes which adjoin the pole heads, as a result of which the magnetic return path regions define the winding space in part transversely to the circumferential direction.

5. The stator of claim 4, wherein the stator poles are arranged in the circumferential direction in such a way that the magnetic return path regions thereof alternately define a respective opposing region of the winding space transversely to the circumferential direction.

6. The stator of claim 4, wherein the winding space comprises a first circumferential subspace and a second circumferential subspace which is at a distance therefrom axially, and
wherein the stator winding comprises a first partial winding arranged in the first circumferential subspace, and a second partial winding arranged in the second circumferential subspace, the first partial winding and the second partial winding being electrically coupled to one another such that a same electric current is supplied thereto.

7. The stator of claim 6, wherein the first partial winding and the second partial winding are electrically coupled to one another such that the same electric current is supplied to the partial windings in opposite directions in the circumferential direction.

8. The stator of claim 6, wherein, in the circumferential direction, the winding space comprises at least two segment spaces arranged adjacently to one another, and the stator winding comprises respective segment windings arranged in the segment spaces.

9. The stator of claim 8, wherein, during segmentation, the segment windings of respective partial windings of respective subspaces arranged at a distance from one another axially are connected in series in an opposing region in the circumferential direction.

10. The stator of claim 4, wherein the stator winding comprises a plurality of electrical conductor elements arranged at a distance from one another.

11. The stator of claim 4, wherein the body element comprises a soft magnetic composite as a material at least in part.

12. The stator of claim 4, wherein an arrangement of the adjacent stator poles is configured to completely encompass the winding space as viewed in the circumferential direction.

13. A transverse flux machine comprising:
a stator having a stator winding arranged in a winding space and a plurality of stator poles, each stator pole of the plurality of stator poles comprising a body element having a ferromagnetic material, wherein the body element has at least one pole head and a magnetic return path region; and two rotors arranged so as to be rotatable relative to the stator, wherein the two rotors are arranged coaxially with one another and at a distance from one another radially, wherein the stator is arranged radially between the two rotors, wherein the winding space is formed circumferentially in a circumferential direction in relation to an axis of rotation of the two rotors, wherein the stator poles are arranged at a distance from one another in the circumferential direction, wherein the stator poles are arranged in such a way that pole heads of the stator poles are opposite a rotor of the two rotors in an installation position, wherein the stator poles are configured to occupy only a portion of a circumference of the winding space in the circumferential direction when in the installation position, and wherein magnetic return path regions of the stator poles have curved shapes which adjoin the pole heads, as a result of which the magnetic return path regions define the winding space in part transversely to the circumferential direction.

14. The transverse flux machine of claim 13, wherein the stator winding comprises at least two circumferential partial windings formed at a distance from one another axially, and wherein a rotor of the two rotors is arranged for each circumferential partial winding of the at least two circumferential partial windings.

15. A linear machine comprising:

a stator having a stator winding arranged in a winding space and a plurality of stator poles, each stator pole of the plurality of stator poles comprising a body element having a ferromagnetic material, wherein the body element has at least one pole head and a magnetic return path region; and at least one rotor arranged so as to be transversely displaceable relative to the stator, the winding space being formed in a longitudinal direction along a displacement path of the at least one rotor, wherein the stator poles are arranged at a distance from one another along the displacement path, wherein adjacent stator poles are arranged in such a way that pole heads of a first stator pole of the adjacent stator poles are positioned in an opposite direction from pole heads of a second stator pole of the adjacent stator poles, and wherein the stator poles are arranged such that pole heads of the stator poles, in an installation position, are opposite the at least one rotor, and return path regions of the stator poles define the winding space in part transversely to the displacement path.

* * * * *